(No Model.)

O. C. WHITE.
BALL AND SOCKET JOINT.

No. 259,957. Patented June 20, 1882.

Witnesses.
S. N. Piper
E. B. Pratt

Inventor.
Otis C. White.
by R. H. Eddy att'y.

UNITED STATES PATENT OFFICE.

OTIS C. WHITE, OF HOPKINTON, MASSACHUSETTS.

BALL-AND-SOCKET JOINT.

SPECIFICATION forming part of Letters Patent No. 259,957, dated June 20, 1882.

Application filed May 6, 1882. (No model.)

*To all whom it may concern:*

Be it known that I, OTIS C. WHITE, of Hopkinton, in the county of Middlesex, of the State of Massachusetts, have invented a new and useful Improvement in Ball-and-Socket Joints; and I do hereby declare the same to be described in the following specification and represented in the accompanying drawings, of which—

Figure 1:
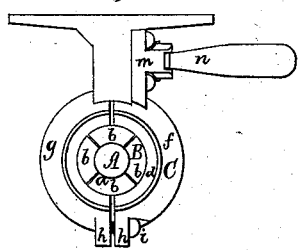
Figure 5:
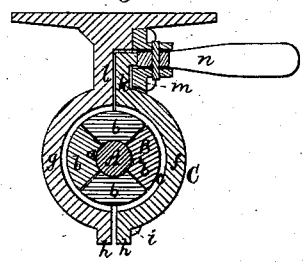
Figure 2:
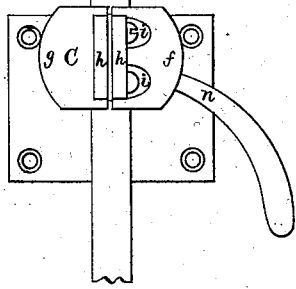
Figure 3:
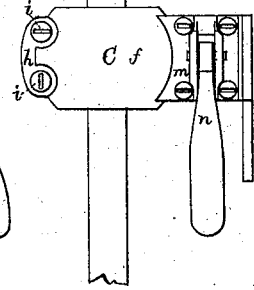
Figure 4:
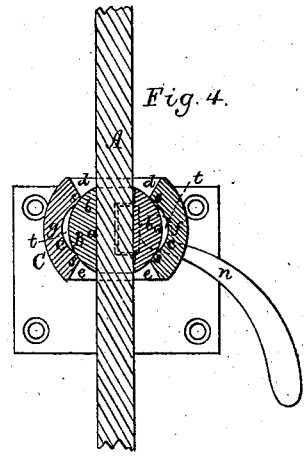
Figure 6:
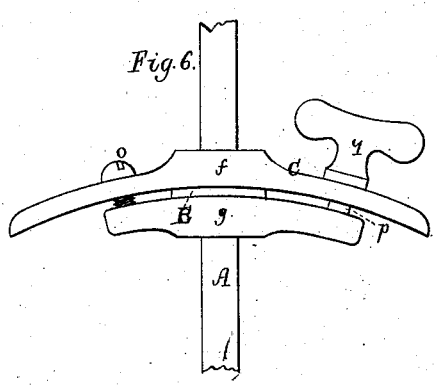

Figure 1 is a top view, Fig. 2 an end elevation, Fig. 3 a side elevation, Fig. 4 a transverse section, and Fig. 5 a horizontal section, of one construction of a joint of my improved kind with its slide-bar. Fig. 6 is a side view, and Fig. 7 a longitudinal section, of a joint somewhat differently constructed, but embracing my invention, the nature of which is defined in the claims hereinafter presented.

This ball-and-socket joint is to give support to and allow to slide lengthwise, or be revolved or be turned laterally in various directions, a rod arranged within and going through the ball, such ball being bored diametrically to receive the rod, and constructed in sections or made contractile to admit of it being clamped on the rod. The socket or socket-piece for holding the ball is also contractile, and provided with means of contracting it upon the ball in order to compress it or its sections on the rod. Furthermore, the socket is provided with conical or flaring mouths, to allow of lateral movements of the rod.

In the drawings, A denotes the slide-rod, B the ball, and C its socket-piece.

The rod A, I usually make cylindrical; but it may be prismatic. It goes through the ball diametrically thereof, which is properly perforated or bored to receive it.

Besides having the bore $a$, the ball is made in separate pieces or sections, $b$, which extend about the rod, and are arranged within a chamber, $c$, of the socket-piece C, such space being spherical or of other proper form, and provided with two conical or flaring mouths, $d\ e$, arranged with it, as represented.

The socket-piece is split transversely or made in separate parts, $f$ and $g$. In Figs. 1 to 5 the said parts $f$ and $g$ are represented as having flanges $h$ and connected by screws $i$, going through one flange and screwed into the other. The part $f$ is also shown as having a portion, $k$, of it projecting from it into a supporting-stand, $l$, from which the part $g$ extends.

Across and fastened to the stand is a cap, $m$, provided with a cammed lever, $n$, which, on being turned one way within the cap, acts against the portion $k$ so as to force the socketed part $f$ toward the socketed part $g$ in order to contract the ball upon the rod. On the cammed lever being turned the opposite way the ball will be free to turn within its socket in various directions, and the rod will be free to be revolved on its axis, or to be turned laterally with the ball in the socket, or to be slid lengthwise within the ball.

Figure 7:
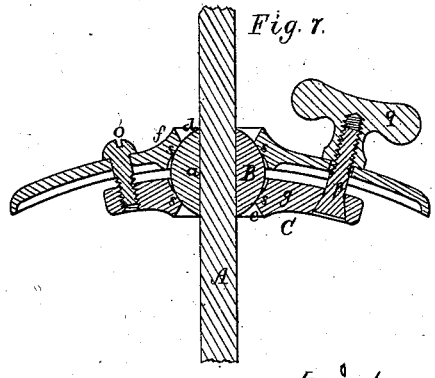

In Figs. 6 and 7 the socket-piece is represented as made in two parts, $f\ g$, connected by two screws, $o\ p$, and a thumb-nut, $q$, screwed upon one of them. The screw $o$ goes through the larger part $f$ and screws into the lesser part $g$, while the screw $p$ goes through and has its head inserted in the lesser part. Its shank goes through the larger part and has the nut screwed on it, (the said shank.)

Instead of making the socket to bear on its entire surface against the ball-sections, I usually so construct the socket that each separate portion of it shall have a narrow annular bearing or belt only to bear upon the ring-sections. This bearing is shown at $s\ s$ in Figs. 4 and 7. By so constructing the bearings of the socket advantage is obtained, as the annular space $t$ below the annular bearing-surfaces will answer to hold oil or a lubricating matter and the clamping parts will act with better effect on the ball.

I claim as my invention as follows, viz:

1. The combination of the ball, made in sections as described, with the contractile socket-piece, provided with means of clamping or contracting it upon the ball.

2. The ball, contractile or made in sections and perforated diametrically, in combination with the slide-rod extended through the ball, and with the contractile socket-piece, provided with means of contracting or clamping it on the ball, as set forth.

3. The ball-socket provided with the annular or belt-shaped bearings $s\ s$ to rest against the ball, and with the intervening annular space to be out of contact with the ball.

4. The ball, made in sections and perforated diametrically to receive the slide-rod, in combination with the socket-piece, socketed to receive the ball, and having to the socket flaring mouths arranged therewith, as set forth.

OTIS C. WHITE.

Witnesses:
R. H. EDDY,
E. B. PRATT.